United States Patent [19]

Rolando et al.

[11] Patent Number: 5,314,959

[45] Date of Patent: May 24, 1994

[54] GRAFT COPOLYMERS CONTAINING FLUOROALIPHATIC GROUPS

[75] Inventors: Richard J. Rolando; James E. Sax, both of Oakdale, Minn.

[73] Assignee: Minnesota Mining and Manufacturing Company, St. Paul, Minn.

[21] Appl. No.: 665,271

[22] Filed: Mar. 6, 1991

[51] Int. Cl.$^5$ ............... C08F 255/02; C08F 255/10; C08F 257/02; C08F 265/06

[52] U.S. Cl. .................. 525/276; 525/291; 525/293; 525/297; 525/302; 525/308; 525/313; 525/319; 525/320; 525/322; 525/324

[58] Field of Search ............. 525/276, 302, 308, 313, 525/320, 322, 324, 291, 293, 297, 319

[56] References Cited

U.S. PATENT DOCUMENTS

| | | | |
|---|---|---|---|
| 2,642,416 | 6/1953 | Ahlbrecht et al. | 260/83.5 |
| 2,803,615 | 8/1957 | Ahlbrecht et al. | 260/29.6 |
| 2,841,573 | 7/1958 | Ahlbrecht et al. | 260/79.3 |
| 3,102,103 | 8/1963 | Ahlbrecht et al. | 260/29.6 |
| 3,177,270 | 4/1965 | Jones et al. | 260/878 |
| 3,250,807 | 5/1966 | Fritz et al. | |
| 3,282,905 | 11/1966 | Fasick et al. | 260/89.5 |
| 3,304,278 | 2/1967 | Hauptschein et al. | 260/29.6 |
| 3,378,609 | 4/1968 | Fasick et al. | 260/890 |
| 3,384,627 | 5/1968 | Anello et al. | 260/89.5 |
| 3,386,977 | 6/1968 | Kleiner | 260/86.1 |
| 3,392,046 | 7/1968 | Marder | 117/143 |
| 3,394,116 | 7/1968 | Sonkin | |
| 3,407,183 | 10/1968 | Farah et al. | 260/79.3 |
| 3,442,942 | 5/1969 | Sianesi et al. | |
| 3,450,611 | 6/1969 | Loffelhosz et al. | |
| 3,451,907 | 6/1969 | Sianesi et al. | |
| 3,514,420 | 5/1970 | Katsushima et al. | 260/29.6 |
| 3,532,659 | 10/1970 | Hager et al. | 260/29.6 |
| 3,544,663 | 12/1970 | Hauptschein et al. | 260/900 |
| 3,546,187 | 12/1970 | Tandy | 260/80.76 |
| 3,547,861 | 12/1970 | Anello et al. | 260/89.5 |
| 3,574,791 | 4/1971 | Sherman et al. | 525/276 |
| 3,578,487 | 5/1971 | Knell et al. | 117/121 |
| 3,699,145 | 10/1972 | Sianesi et al. | |
| 3,715,378 | 2/1973 | Sianesi et al. | |
| 3,810,874 | 5/1974 | Mitsch et al. | |
| 3,864,318 | 2/1975 | Caporiccio et al. | |
| 3,876,729 | 4/1975 | Mueller | 525/276 |
| 3,896,167 | 7/1975 | Sianesi et al. | |
| 4,003,874 | 1/1977 | Ide et al. | 260/42.18 |
| 4,015,612 | 4/1977 | Pavlik et al. | 525/359.4 |
| 4,080,319 | 3/1978 | Caporiccio et al. | |
| 4,085,137 | 4/1978 | Mitsch et al. | |
| 4,094,911 | 6/1978 | Mitsch et al. | |
| 4,146,529 | 3/1979 | Yamamoto et al. | 260/42.18 |
| 4,228,255 | 10/1980 | Fujimoto et al. | 525/288 |
| 4,321,404 | 3/1982 | Williams et al. | |
| 4,404,247 | 9/1983 | Dominguez-Burguette et al. | |
| 4,472,480 | 9/1984 | Olson | |
| 4,565,714 | 1/1986 | Koshar | |
| 4,567,073 | 1/1986 | Larson et al. | |
| 4,569,962 | 2/1986 | Burguette et al. | |
| 4,647,413 | 3/1987 | Savu | |
| 4,743,300 | 5/1988 | Brinduse et al. | |
| 4,830,910 | 5/1989 | Larson | |
| 4,841,090 | 6/1989 | Patel | 428/288 |
| 4,857,254 | 8/1989 | Wong et al. | |
| 4,950,549 | 8/1990 | Rolando et al. | |
| 4,988,771 | 1/1991 | Takeuchi et al. | 525/276 |
| 5,213,743 | 5/1993 | Ohara et al. | 264/171 |

FOREIGN PATENT DOCUMENTS 0393230 10/1990 European Pat. Off.
1393693 5/1975 United Kingdom.

OTHER PUBLICATIONS

Plastics Compounding, Jan./Feb. 1986, pp. 44–53 (Eise et al.).
Plastics Compounding, Sep./Oct. 1986, pp. 24–39 (Frund et al.).
Polymer Prep., 1986, 27, 89 (Al-Malaika).

*Primary Examiner*—Vasu S. Jagannathan
*Attorney, Agent, or Firm*—Gary L. Griswold; Walter N. Kirn; Carole Truesdale

[57] ABSTRACT

A fluorochemical graft copolymer comprising: a base polymer comprising polymerized units derived from monomers having terminal olefinic double bonds, having a moiety comprising a fluoroaliphatic group grafted thereto. Also disclosed are processes for preparing such fluorochemical graft copolymers, forming and annealing methods for enhancing the surface activity of such a graft copolymer, polymer blends comprising such a fluorochemical graft copolymer and a matrix polymer that is miscible with the base polymer, and a method for reducing the surface energy of a polymer comprising polymerized units derived from monomers having terminal olefinic double bonds.

8 Claims, 1 Drawing Sheet

GRAFT COPOLYMERS CONTAINING FLUOROALIPHATIC GROUPS

BACKGROUND OF THE INVENTION

1. Technical Field

This invention relates to continuous processes using wiped-surface reactors for free radical graft polymerization of polyolefins, and to graft copolymers thereby produced. In another aspect, this invention relates to polymerizable olefins containing fluoroaliphatic groups, and copolymers thereof.

2. Description of the Related Art

Processing or production of polymeric resins using wiped-surface reactors such as screw extruders and twin screw extruders is well known (such processing is often called reactive extrusion). Twin screw extruders and their use in continuous processes such as graft polymerization, alloying, bulk polymerization of vinyl monomers, and condensation and addition reactions are generally described in Plastics Compounding Jan./Feb. 1986, pp. 44–53 (Eise et al.) and Plastics Compounding, Sept./Oct. 1986, pp. 24–39 (Frund et al.). Graft reactions are said to be carried out by first melting a polymeric species in the initial stages of an extruder, injecting a peroxide catalyst into the extruder, and mixing in a monomer under high shear conditions. Advantages of the twin screw extrusion process are said to include narrow distribution of molecular weight, improved melt-flow properties, consistent process control, and continuous processing.

Graft polymerization reactions of polyolefins with various monomers using wiped-surface reactors are known. Such grafting is said to be useful in providing a polymer adduct with functionality to allow further modification of structure and properties. General mechanistic proposals regarding formation of these "mechanochemically synthesized" adducts are discussed in connection with grafting of maleic anhydride onto polypropylene in Polymer Prep., 1986, 27, 89 (Al-Malaika).

A number of particular free radical graft polymerization reactions have been reported. For example, U.S. Pat. No. 3,177,270 (Jones et al.) discloses a process for preparing graft copolymers by mixing an olefin polymer at a temperature between 110° C. and 250° C. while contacting the polymer with a minor proportion of a mixture comprising a monovinyl aromatic compound and optionally one or more other monomers such as acrylic acid, methacrylic acid, acrylonitrile, methyl methacrylate, methacrylonitrile, or maleic anhydride, the mixture having dissolved therein an organic peroxide.

British Pat. No. 1,292,693 (Steinkamp et al.) discloses use of a single-screw extruder to graft monomers such as maleic anhydride and acrylic acid onto polyolefins such as polypropylene in the presence of a suitable free radical initiator such as an organic peroxide. The product graft copolymers are said to have a melt flow rate (MFR) of at least 50% greater than the MFR of the base polymer.

U.S Pat. No. 4,003,874 (Ide et al.) discloses modified polyolefins obtained by adding an unsaturated carboxylic acid or an anhydride thereof and an organic peroxide to a polyolefin and melting these components in an extruder. The polyolefin so obtained is said to adhere to glass fibers.

U.S. Pat. No. 4,146,529 (Yamamoto et al.) discloses a process for production of modified polyolefins by combining a polyolefin with one or more carboxylic acids or their anhydrides in an extruder in the presence of a radical producing agent and an organosilane.

U.S. Pat No. 4,228,255 (Fujimoto et al.) discloses a method for crosslinking a polyolefin, the polyolefin being a low density polyethylene or a polyolefin mixture containing a low density polyethylene, comprising reacting the polyolefin with an organic silane and an organic free radical initiator to form a silane-grafted polyolefin, then mixing the silane-grafted polyolefin with a silanol condensation catalyst. The mixture is extruded with heating in a single-screw extruder to provide a crosslinked polyethylene.

SUMMARY OF THE INVENTION

This invention provides a fluorochemical graft copolymer comprising: a base polymer comprising polymerized units derived from monomers having terminal olefinic double bonds, having a moiety comprising a fluoroaliphatic group grafted thereto. The grafted fluoroaliphatic group is generally derived from a fluorochemical olefin comprising a fluoroaliphatic group and a polymerizable double bond.

The fluoroaliphatic group of the fluorochemical olefin is generally bonded to the polymerizable double bond through a linking group. Such fluorochemical olefins can be represented by Formula I below:

$$(R_f)_a Q (CR=CH_2)_b \qquad \text{I}$$

R is hydrogen, trifluoromethyl, or straight chain or branched chain alkyl containing 1 to about 4 carbon atoms;

a is an integer from 1 to about 10;

b is an integer from 1 to about 6;

Q is an (a+b)-valent linking group that does not substantially interfere with free radical polymerization; and $R_f$ is a fluoroaliphatic group comprising a fully fluorinated terminal group containing at least seven fluorine atoms.

This invention also provides a process for preparing the fluorochemical graft copolymers described above, which process comprises the steps of (1) feeding to a reactor materials comprising
  (a) a base polymer comprising polymerized units derived from monomers having terminal olefinic double bonds;
  (b) an effective amount of a free radical initiator system comprising one or more free radical initiators; and
  (c) a fluorochemical olefin as described above, wherein all materials are substantially free of oxygen;

(2) reacting the materials in the reactor to provide a graft copolymer; and (3) withdrawing the graft copolymer from the reactor.

Preferably, the base polymer is fed to the reactor in a region of the reactor preceding or coincident with the region in which the initiator system is fed and the fluorochemical olefin is fed to the reactor in a region of the reactor subsequent to the region in which the initiator is fed.

A preferred embodiment of the process of the invention involves use of a least two free radical initiators to maximize the number of grafted fluorochemical moieties. Desired thermoplastic, melt-flow, and low surface energy properties of the resultant graft copolymer can thus be optimized.

In another aspect, this invention provides methods of enhancing the surface activity of a fluorochemical graft copolymer film. One such method is an annealing method comprising the steps of:

a) providing a surface comprising a fluorochemical graft copolymer as described above, and
b) annealing the surface by heating it at a temperature and for a time effective to increase the amount of the grafted fluorochemical at the surface This invention also provides a forming method for controlling the amount of grafted fluorochemical at the surface of a composition comprising a graft copolymer of the invention, comprising the steps of (1) selecting a surface that is made of a material that will control the amount of grafted fluorochemical at the surface of the composition; and
(2) forming the composition against the surface selected in step (1).

This invention also provides polymer blends comprising a fluorochemical graft copolymer as described above and a matrix polymer that is miscible with the base polymer of the graft copolymer.

Further, this invention provides a method for reducing the surface energy of a polymer, comprising the step of grafting to said polymer a fluorochemical olefin comprising a fluoroaliphatic group and a polymerizable double bond.

Relatively little fluorochemical olefin is required for the preparation of the graft copolymers of the invention, and the forming and annealing methods further reduce the amount of fluorochemical needed for a particular application.

Graft copolymers of the invention have lower surface energies than the corresponding base polymers, and they exhibit desirable thermoplastic, melt flow, and release properties. Moreover, these graft copolymers are useful in applications where oil repellency and solvent resistance are desirable.

BRIEF DESCRIPTION OF THE DRAWING

The Drawing is represented by FIGS. 1-3.

DETAILED DESCRIPTION OF THE INVENTION

Figure 1:
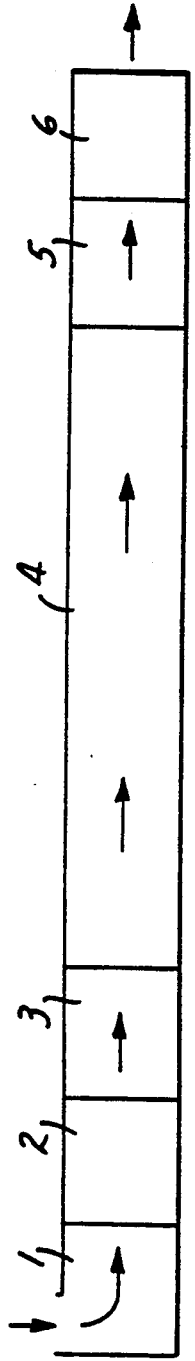
FIG. 1 is an exemplary flow diagram of the process of the invention. Ancillary equipment such as pumps and valves, has not been illustrated, and secondary process streams such as utility lines (e.g., cooling water) have been omitted.

A fluorochemical graft copolymer of the invention comprises a base polymer having a moiety comprising a fluoroaliphatic group grafted thereto. Generally a plurality of the grafted moiety is present in a graft copolymer of the invention.

The fluoroaliphatic group is generally derived from a fluorochemical olefin comprising a fluoroaliphatic group and a polymerizable double bond. The grafting occurs through the polymerizable double bond. The double bond is of course not present in the product graft copolymer of the invention; rather, in the grafting process the double bond becomes a saturated link between the base polymer and the fluoroaliphatic group. In the instant specification and claims a reference to a fluoroaliphatic group grafted through a double bond designates the presence of such a saturated link and does not designate the presence of olefinic unsaturation in the grafted moiety as it is incorporated in the graft copolymer.

Suitable base polymers include polymers comprising polymerized units derived from monomers having terminal olefinic double bonds. This class of polymers is known to those skilled in the art and includes polymers such as polymethyl methacrylate, poly-4-methylpentene, polypropylene, polybutylene, polystyrene, polyethylene, polybutadiene, and copolymers such as ethylene/vinyl acetate copolymer and ethylene/butyl acrylate copolymer, and the like, and mixtures and blends thereof. Such polymers of any molecular weight are suitable. Polymers with a wide range of melt index values (e.g., from about 0.1 to about 500) are suitable. Melt index values are determined by the American Society for Testing Materials method ASTM D-1238. Due to their relatively low viscosity and ability to diffuse to the surface of a polymer blend, low molecular weight polyolefins, preferably with melt indices of at least about 20, (e.g., low molecular weight polyethylene and polypropylene), and up to about 500 are particularly useful as base polymers for graft copolymers of the invention that are intended for use in the polymer blends of the invention (described in detail below).

Fluorochemicals that can be grafted to the base polymer include known fluorochemical olefins that comprise a fluoroaliphatic group and a polymerizable double bond. Fluorochemical olefins suitable for use in the invention include those disclosed in, for example, U.S. Pat. Nos. 2,642,416 (Ahlbrecht et al.), 2,803,615 (Ahlbrecht et al.), 2,841,573 (Ahlbrecht et al.), 3,102,103 (Ahlbrecht et al.), 3,282,905 (Fasick et al.), 3,304,278 (Hauptschein et al.), 3,378,609 (Fasick et al.), 3,384,627 (Anello et al.), 3,386,977 (Kleiner), 3,392,046 (Marder), 3,407,183 (Farah et al.), 3,514,420 (Katsushima et al.), 3,532,659 (Hager et al.), 3,544,663 (Hauptschein et al.), 3,546,187 (Tandy), 3,547,861 (Anello et al.), and 3,578,487 (Knell et al.), the disclosures of which are incorporated herein by reference. The list above is intended to be merely exemplary and not exhaustive of patents disclosing suitable fluorochemical olefins. Generally, suitable fluorochemical olefins comprise a fluoroaliphatic group bonded through a linking group to a polymerizable double bond and can be represented by the general Formula I below:

$$(R_f)_a Q(CR\!=\!CH_2)_b \qquad\qquad I$$

wherein a, b, R, $R_f$ and Q are as defined above.

In a compound of Formula I, a and b are integers representing the number of fluoroaliphatic groups and the number of olefinic groups, respectively, in the fluorochemical olefin. The value of a can be 1 to about 10, preferably 1 to about 6, more preferably 1 to about 3, and most preferably 1. The value of b can be 1 to about 6, preferably 1 to about 3, and more preferably 1. R in a compound of Formula I is hydrogen, trifluoromethyl, or lower alkyl (i.e., straight chain or branched chain alkyl of 1 to about 4 carbon atoms).

Q is an (a+b)-valent organic moiety that can have a wide variety of structures, for example, alkylene, e.g., methylene, ethylene, cyclohexylene, arylene, e.g., phenylene, and combinations thereof, e.g. xylylene, or combination of such moieties with such heteroatom-containing moieties as oxy, thio, aza, carbonyl, sulfonyl, sulfoxy, sulfonamido, carboxamido, urylene, carbamato, and imino, and combinations thereof such as sulfonamidoalkylene, carboxamidoalkylene, oxydialkylene, alkylenecarbamato and the like. The particular structure of Q for a particular fluorochemical olefin is not unduly critical to this invention. Q can therefore be selected by virtue of ease of preparation and, for example, commercial availability of the fluorochemical olefin or the particular reactants used in preparing the fluorochemical olefin.

$R_f$ is a fluoroaliphatic group that is a fluorinated, stable, inert, non-polar, preferably saturated, and both hydrophobic and oleophobic. $R_f$ can be straight chain, branched chain, or, if sufficiently large, cyclic, or a combination thereof, such as alkylcycloalkyl. The fluoroaliphatic group can also include catenary oxygen, sulfur, or nitrogen. Generally $R_f$ will have 3 to about 20 carbons atoms, preferably 6 to about 12 carbon atoms, and will contain about 40 to about 78 weight percent, preferably about 50 to about 78 weight percent, carbon-bound fluorine. The terminal portion of the $R_f$ group is fully fluorinated and contains at least 7 fluorine atoms. Exemplary terminal portions include $-CF_2CF_2CF_3$, $-CF(CF_3)_2$, $-CF_2SF_5$, and the like. Preferred $R_f$ groups are fully or substantially fully fluorinated, as in the case where $R_f$ is perfluoroalkyl (i.e., $C_nF_{2n+1}$).

Several particular exemplary compounds of Formula I are shown below:

$C_8F_{17}SO_2N(C_4H_9)CH_2CH_2O(O)CCH=CH_2$
$C_8F_{17}SO_2N(C_2H_5)CH_2CH_2O(O)CCH=CH_2$
$C_8F_{17}SO_2N(C_2H_5)CH_2CH_2O(O)CC(CH_3)=CH_2$
$C_7F_{15}CH_2O(O)CCH=CH_2$
$C_7F_{15}CH_2O(O)CC(CH_3)=CH_2$
$C_8F_{17}SO_2N(C_2H_5)CH_2CH=CH_2$
$C_8F_{17}SO_2N(CH_3)CH_2CH_2O(O)C(CH_3)=CH_2$
$C_8F_{17}SO_2N(CH_3)CH_2CH_2CH_2CH_2O(O)C(CH_3)=CH_2$
$C_8F_{17}SO_2N(CH_3)CH_2CH=CH_2$
$C_8F_{17}SO_2N(CH_2)CH_2CH_2OCH=CH_2$
$C_4F_9OC_3F_6OCF(CF_3)CH_2O(O)CCH=CH_2$
$C_8F_{17}C_2H_4SO_2N(CH_3)C_2H_4O(O)CCH=CH_2$
$C_8F_{17}(CH_2)_{10}O(O)CCH=CH_2$
$C_8F_{17}CH_2CH_2O(O)CCH=CH_2$
$C_6F_{13}C_2H_4SC_2H_4O(O)CCH=CH_2$
$(C_3F_7)_3CCH_2O(O)CCH=CH_2$
$(C_4F_9CO)_2NCH_2CH_2O(O)CC(CH_3)=CH_2$

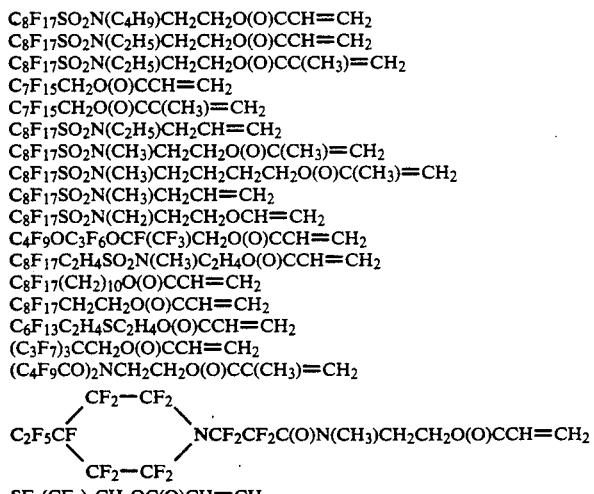

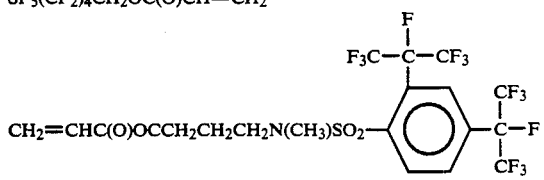

In a preferred embodiment, the graft copolymer comprises a polymeric backbone comprising polymerized units derived from monomers having terminal olefinic double bonds, having bonded thereto a moiety of the formula

wherein Q is a divalent linking group that does not substantially interfere with free radical polymerization, and R and $R_f$ are as defined above.

Preferably a graft copolymer of the invention comprises about 0.1% to about 20%, more preferably 0.5 to about 10% by weight of grafted fluorochemical olefin. In a process of the invention as described below it is preferred to use like quantities of fluorochemical olefin, i.e., about 0.1 to about 20% or more by weight, more preferably 0.5 to about 10% weight based on the weight of the base polymer.

In a process of the invention, the base polymer and a fluorochemical olefin are reacted in the presence of an initiator system comprising one or more free radical initiators to provide a fluorochemical graft copolymer. The initiator system serves to initiate free radical grafting of the fluorochemical olefin onto the base polymer.

Many initiators are known. Suitable initiators include: hydroperoxides such as cumene, t-butyl, and t-amyl hydroperoxides, and 2,5-dihydroperoxy-2,5-dimethylhexane; dialkyl peroxides such as di-t-butyl, dicumyl, and t-butyl cumyl peroxides, 2,5-dimethyl-2,5-di(t-butylperoxy)hexane, and 2,5-dimethyl-2,5-di(t-butylperoxy)hex-3-yne; peroxyesters such as t-butyl perbenzoate and di-t-butyl-diperoxy phthalate, diacyl peroxides such as benzoyl peroxide and lauroyl peroxide; peroxyketals such as n-butyl-4,4-bis(t-butylperoxy)valerate and 1,1,-di-t-butylperoxy-3,3,5-trimethylcyclohexane; and azo compounds such as azoisobutyronitrile.

Reaction conditions under which a graft copolymer of the invention can be prepared typically involve heating at about 150° C. to about 250° C. Reactants typically have a residence time of about 1 to 20 min. It is therefore difficult to select a single initiator with a decomposition rate such that initiating radicals will be present in a substantial concentration for a prolonged period of time when a low concentration of initiator is used. It is therefore preferred to use a mixture of at least two initiators as an initiator system. Proper selection of the components of the initiator system overcomes the above-discussed difficulty with single initiators, and allows control and optimization of the physical properties of the product graft copolymer.

Generally it is preferred that each initiator in an initiator system have a rate of decomposition substantially different from those of the other initiators in the initiator system. For example, in a process with a residence time of about 5-10 minutes at a temperature of about 200° C., an initiator system wherein one initiator has a half-life of about 30 seconds and the other initiator has a half-life of about 2 minutes has been found suitable.

Preferred initiator systems include mixtures comprising from about 40% to about 60% by weight of 2,5-dimethyl-2,5-di(t-butylperoxy) hexane, (such as that commercially available as LUPERSOL TM 101 from Pennwalt Corporation) and from about 60% to about 40% by weight of an initiator such as 2,5-dimethyl-2,5-di(t-butylperoxy) (such as that commercially available as LUPERSOL TM 130, Pennwalt Corporation), t-butylhydroperoxide, or di-t-butylperoxide. Initiator decomposition rates are temperature dependent, and other particular initiator systems and preferred concentrations thereof can be selected by those skilled in the art consistent with the temperature of the reaction and the residence time of the reactants.

Total initiator concentration in a process of the invention is preferably from about 0.1% to about 1%, more preferably from about 0.25% to about 0.5% based on the weight of the base polymer.

Fluorochemical graft copolymers of the invention can be prepared using various well known reactors such as stirred tank reactors, tubular reactors, and extruders. Graft copolymers are preferably made by a process involving a wiped-surface reactor. A wiped surface reactor comprises a shell or vessel that contains at least one rotor having a wiping portion located close to the inside surface of the shell and a root portion spaced further from the shell than the wiping portion. As the rotor is rotated, the wiping portion passes close enough to the inside surface of the shell to clean the surface and form a seal when the reactor contains monomer and/or polymer but not so close as to cause permanent deformation of either the rotor or shell. It is necessary that the root surface of the rotor also be wiped or cleaned continuously during the operation of the reactor.

Intermeshing twin screw extruders can be used as wiped surface reactors. The screws function as the rotor and the flight lands function as the wiping portion, while the screw root surface between the flight lands functions as the root surface. Clearances between the inside of the barrel wall of the extruder and the flight lands of the screws are preferably from about 0.25 to 0.5 mm. Although co-rotating twin screw extruders can be used, counter-rotating twin screw extruders are preferred. The counter-rotating extruder acts as a positive displacement pump conveying the reactant stream, and it also behaves as a series of small mixing zones or continuous stirred tank reactors. The counter-rotating twin screw extruder also gives good control over melting, mixing, and reaction temperatures.

Preferably, screws of a counter-rotating twin screw extruder are divided into segments, i.e., extruder screws can be composed of a number of separate screw segments that fit onto a common drive shaft by a keyway and can be disassembled and rearranged in various orders and configurations. It is also possible to use screw segments having multiple (e.g., two or three) starts and various pitch, and one or more screw segments can be reversed to increase mixing. Residence time of the reactants, and properties of the resultant product, can therefore be varied by selection of screw pitch and/or screw speed (i.e., screw rpm). Furthermore, each particular zone of a twin screw extruder can be independently heated or cooled by external heating or cooling means, allowing further control of reaction conditions.

Use of a wiped surface reactor in the invention is discussed referring to FIG. 1. A base polymer can be fed in a region of the reactor coincident with the region in which the initiator system is fed. For example, the desired base polymer, preferably in pellet form, can be wetted with a free radical initiator system and purged with an inert gas such as nitrogen, helium, argon or the like, to render the material substantially free of oxygen (i.e., oxygen, if present, is present in an amount such that it does not significantly affect the desired free radical polymerization reactions). This material can be fed at a predetermined rate into feed zone 1 of the wiped surface reactor. It is preferred, however, to feed the base polymer in a region of the reactor preceding the region in which the initiator system is fed. Feed zone 1 typically comprises a feed throat, into which base polymer can be fed into the upstream end, and into which the initiator system can be fed at the downstream end.

A further alternate method of feeding the base polymer and the initiator involves use of a 2-component feed zone consisting of a base polymer feed zone into which base polymer is fed, followed in sequence by a separate initiator feed zone into which the initiator is fed. The extruder is preferably starve fed, i.e., all material fed into the feed zone is conveyed into initiator/melt zone 2 of the extruder, and nothing is held up in feed zone 1.

Feed rates can vary with the size of the reactor and for any given size of reactor, one skilled in the art will be able to determine suitable feed rates. As an example, when a 34 mm counter-rotating twin screw extruder is used, feed rates are preferably from about 0.4 Kg/h to about 9 Kg/h. The feed zone screw preferably has a high pitch (e.g., 20 mm) to accommodate base polymer pellets The feed zone can, if desired, be operated in a temperature controlled manner, depending on the reactants, reaction conditions and the like. Generally, it is suitable to maintain the feed zone of the extruder in a temperature range from about 10° C. to about 50° C., depending on the base polymer used.

In initiation/melt zone 2, the initiator system and base polymer are mixed and heated to initiate radical chain reactions. Preferred temperatures will depend on the particular base polymer and initiator system, but generally temperatures in the range between 150° C. and about 250° C. are suitable.

In monomer addition zone 3, a nitrogen-purged fluorochemical olefin is added, usually by a high pressure pump and under an inert atmosphere. The fluorochemical olefin is generally fed as a liquid or as a solution in an inert solvent (e.g., decane, toluene, tetrahydrofuran or the like. Preferred feed rates are variable, and when a LEISTRITZ TM 34 mm counter-rotating twin screw extruder is used, feed rate is preferably about 4 g/h to about 180 g/h. It is preferred to maintain the monomer addition zone at a temperature of about 150° C. to about 250° C.

Grafting proceeds in reaction zone 4. The reaction zone is heated. As with the initiator/melt zone, the preferred temperature will depend on the particular base polymer and initiator system used. Further, the preferred temperature of the reaction zone will depend on the particular base polymer and initiator system used and on the intended residence time in the reaction zone Generally, temperature in the range of 150° C. to 250° C. and residence times in the range of 1 minute to about 10 minutes are suitable.

In reactions where residual solvent or monomer remains, it is preferred to remove it from the grafted product by venting. This can be done in devolatilization zone 5, where a vacuum (e.g., about 10 kPa absolute pressure) can be applied to a vent line. The resultant product is then passed through block zone 6, which conveys the product graft copolymer for any further processing as desired, e.g., shaping in a die, quenching in a suitable quenching liquid, or pelletizing for convenience of handling and/or storage.

The graft copolymers of the invention can find application where good release properties, oil repellency, water repellency, solvent resistance, and other properties of fluorochemicals are advantageous.

The amount of grafted fluorochemical at the surface (i.e., the surface fluorochemical density) of a composition comprising a graft copolymer of the invention can be increased by the annealing method of the invention. In such a method, a graft copolymer or a film thereof is annealed at a temperature and for a time effective to increase the amount of grafted fluorochemical at the surface. Effective temperature and time will bear an inverse relationship to one another and a wide range of conditions will be suitable. Generally, annealing at a temperature between about 50° C. and about 160° C. for a period of several minutes to several hours provides a composition with an increased amount of grafted fluorochemical at the surface. Annealing apparently allows the fluorochemical in the graft copolymer to migrate to the surface with a resultant increase in surface activity, improved release properties, and improved oil and water repellency and solvent resistance.

The annealing method, by increasing surface fluorochemical density, can also serve to minimize the amount of grafted fluorochemical olefin that must be present in a graft copolymer of the invention for a particular application.

Another method of controlling the surface fluorochemical density of a composition comprising a graft copolymer of the invention is a forming method, wherein the composition is formed (e.g., as during molding or during pressing into a film) against a selected forming surface. The effect of the selected forming surface on surface fluorochemical density is as follows: Generally, surface fluorochemical density is greater when a composition is formed against a fluorochemical surface, e.g., polytetrafluoroethylene (PTFE, TEFLON ™ polytetrafluoroethylene, DuPont) or a surface made of a graft copolymer of the invention, than when it is formed against a polyimide surface (e.g., KAPTON ™ polyimide, DuPont). Forming against a chrome surface results in a lower surface fluorochemical density than forming against either polytetrafluoroethylene or polyimide. Through the use of a forming surface having several distinct regions, each of an independently selected material, the forming method of the invention can be used to provide a surface with regionally controlled surface fluorochemical density and hence regionally controlled release properties, oil repellency, and solvent resistance. Further, since the forming method can increase surface fluorochemical density, it can be used to minimize the amount of grafted fluorochemical olefin that must be present in a graft copolymer of the invention for a particular application.

A graft copolymer of the invention can be blended with a matrix polymer that is miscible with the base polymer of the graft copolymer in order to form a polymer blend. The base polymer itself is of course a suitable matrix polymer for use in a polymer blend of the invention. Furthermore, compilations of polymer miscibility data are commonly available. Therefore, suitable matrix polymers, i.e., those that are miscible with the particular base polymer, can be easily selected by those skilled in the art. In a polymer blend of the invention the fluorochemical graft copolymer serves as a fluorochemical additive that imparts improved release properties to the matrix polymer. Also, the physical properties (e.g., viscosity, impact strength) of the graft copolymer can be improved by the matrix polymer. Further, the tendency of the graft copolymer to become "physically crosslinked" with the miscible matrix polymer causes the properties imparted by the fluoroaliphatic groups to be more durable than those imparted by a monomeric fluorochemical additive.

A polymer blend of the invention comprises a fluorochemical graft copolymer of the invention in an amount sufficient to impart to the blend the release properties of the fluorochemical graft copolymer. The amount of fluorochemical graft copolymer that constitutes a sufficient amount will vary with the fluorine content of the graft copolymer, and the preferred amount will vary according to the intended use of the polymer blend, Generally, a polymer blend of the invention preferably comprises at least about 1 percent, more preferably at least about 10 percent, and most preferably at least about 30 percent by weight of graft copolymer based on the weight of the matrix polymer.

Objects, features, and advantages of this invention are further illustrated by the following examples. The particular materials and amounts thereof recited in these examples, as well as other conditions and details, should not be construed to unduly limit this invention.

In the following examples all parts and percentages are by weight unless otherwise specified and all temperatures are in degrees Celsius unless otherwise indicated.

EXAMPLES

EXAMPLE 1–9

Polypropylene resin base polymer (DYPRO ™ 8771 pellets, melt index: 9, commercially available from Fina Co., Houston, Tex.) was mixed in a 5-gallon shaker with 0.25% by weight of 90% liquid 2,5-dimethyl-2,5-di(t-butylperoxy)hexane (LUPERSOL ™ 101, Pennwalt Corporation, Philadelphia, Pa.) and 0.25% by weight of one of the following: (a) 90–95% 2,5-dimethyl-2,5-di(t-butylperoxy)hex-3-yne (LUPERSOL ™ 130, Pennwalt); (b) 90% liquid 5-butyl hydroperoxide (LUPERSOL ™ 90, Pennwalt); (c) 98.5% liquid di-t-butyl peroxide (Pennwalt).

The base polymer/initiator mixture was then purged with nitrogen for 30 minutes. The resin in the feed hopper and in the feed zone of the extruder was kept under nitrogen purge and the base polymer/initiator mixture was fed with an augered feed means into the feed zone of a 34 mm counter-otating LEISTRITZ ™ (LEISTRITZ LSM 30.34 GG, Nurenburg, Germany) twin-screw extruder (length to diameter, L/D=35:1) configured as described below with reference to FIG. 2.

Figure 2:
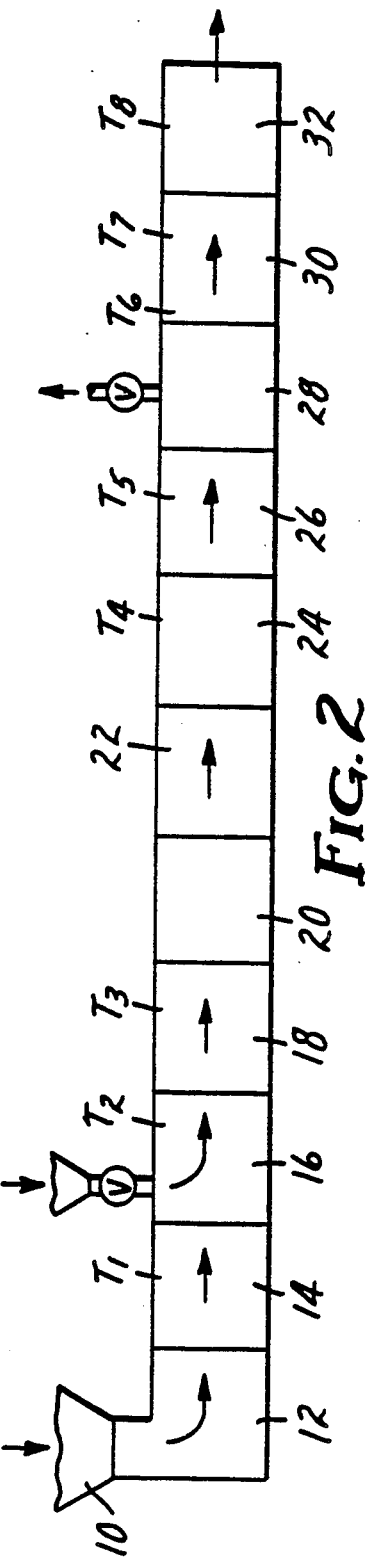
FIG. 2 is a flow diagram of a counter-rotating twin screw extruder useful in this invention.

FIG. 2 shows a twin-screw extruder with a feed hopper 10, feed zone 12, and a heated barrel that comprises: an initiation/melt zone comprising barrel section 14; a reaction zone comprising a monomer feed zone (barrel section 16) and barrel sections 18, 20, 22, 24, and 26; a devolatilization zone comprising barrel section 28; and a block zone comprising barrel sections 30 and 32. Each barrel section is 120 mm long, and the extruder has a total length of 1200 mm.

Transducer ports (e.g., T4 represents transducer number 4 located in barrel section 24) are located at 30 mm, and/or 90 mm into each heated barrel section. Thermocouple ports are located at 60 mm into each heated barrel section. Melt temperatures of 180° C., 200° C., and 220° C. were used with each initiator system. Polymer/initiator flow rate was kept at about 40–50 g/min. N-butyl perfluorooctanesulfonamidoethyl acrylate (BuFOSEA) was purged with nitrogen and added to a nitrogen-purged displacement pump, and added in heated barrel section 16, 270 mm from the start of the screws, at a rate of 1 mL/min. Heated barrel section 28 was vented under vacuum. Product graft copolymers were conveyed from the block zone (barrel sections 30 and 32), which was maintained at 180° C., into a water bath and fed into a pelletizer to afford generally cylindrical beads of 3 to 4 mm in length and a diameter of about 1 mm. Reaction conditions are summarized in TABLE 1, wherein L101 designates LUPERSOL TM 101 initiator, L130 designates LUPERSOL TM 130 initiator, TBHP designates t-butyl-hydroperoxide, and DTBP designates di-t-butyl peroxide.

TABLE 1

| Example | Melt Temp (°) | Initiator Mixture | Polymer Flow Rate (g/min) |
| --- | --- | --- | --- |
| 1 | 180 | L101/L130 | 48.7 |
| 2 | 200 | L101/L130 | 45.0 |
| 3 | 220 | L101/L130 | 41.4 |
| 4 | 180 | L101/TBHP | 46.4 |
| 5 | 200 | L101/TBHP | 44.4 |
| 6 | 220 | L101/TBHP | 44.0 |
| 7 | 180 | L101/DTBP | 44.0 |
| 8 | 200 | L101/DTBP | 43.0 |
| 9 | 220 | L101/DTBP | 35.0 |

Grafting was confirmed by two methods. In the first method, samples in TABLE 1 were extracted in boiling tetrahydrofuran (THF) in a conventional extraction apparatus until a stable weight loss was reached. The polymer was analyzed by infrared spectroscopy before and after extraction. Grafting was confirmed by the presence of strong absorption band at 1720 cm$^{-1}$ after extraction, which corresponds to the carbonyl absorbance of the acrylate moiety.

Samples of the graft copolymers with thickness of about 0.13 mm were made by pressing (at a pressure of about 41.4 kPa for 30 seconds using a WABASH TM heated press, Wabash Co., Wabash, Ind.) about 10 g of the graft copolymers between chrome-coated aluminum plates at about 200° C. Pressed samples were quenched from the molten state to the solid state in a room temperature water bath. Hexadecane contact angle measurements were made on these films and on polypropylene base polymer control sample using the sessile drop method as described by A. W. Newman and R. J. Good in "Techniques for Measuring Contact Angles," *Surface and Colloid Science*, 11, Plenum Press, N.Y., 1979. Results are shown in TABLE 2.

TABLE 2

| Example | Contact Angle (°) |
| --- | --- |
| PP Control | 0 |
| PTFE | 47 ± 1 |
| 1 | 22 ± 3 |
| 2 | 19 ± 3 |
| 3 | 20 ± 2 |
| 4 | 23 ± 3 |
| 5 | 21 ± 3 |
| 6 | 15 ± 2 |
| 7 | 20 ± 3 |
| 8 | 19 ± 4 |
| 9 | 20 ± 2 |

The results in TABLE 2 show improved surface activity, compared to a polypropylene (PP) control, for all Examples.

Electron spectroscopy for chemical analysis (ESCA) measurements were also done to confirm grafting Fluorine to carbon (F:C) ratios for Examples 1 and 4 are listed in TABLE 3 below.

TABLE 3

| Example | Composition | F:C |
| --- | --- | --- |
| Control | PP | 0 |
| 1 | PP/BuFOSEA | 0.25 |
| 4 | PP/BuFOSEA | 0.31 |

TABLE 4 below compares surface energy values determined for films of polypropylene, polytetrafluoroethylene (PTFE), and the graft copolymer of Example 2.

TABLE 4

| Polymer Sample | Surface Energy (Dyne/cm) |
| --- | --- |
| Polypropylene Control | 32 |
| PTFE | 22 |
| Example 2 | 25 |

The data in TABLE 4 indicate that the graft copolymer of Example 2 has a surface energy lower than the polypropylene control and approaching that of PTFE.

180° Peel Adhesion Test:

A 2.5 cm wide, 20.3 cm long strip of pressure-sensitive adhesive tape is adhered to a 10.1 cm wide, 15.2 cm long sheet of a test substrate (a pressed sample of a graft copolymer of the invention) with a free end of the tape extending beyond the end of the test substrate. The tape/substrate sample is rolled twice with a 1.35 kg hard rubber roller to ensure contact between the adhesive and the test substrate. The sample is aged at room temperature for 24 hours. The free end of the tape is removed from the test substrate by pulling at 180° at a rate of 15.2 cm/minute using a Slip/Peel Tester, (available from Instrumentors, Inc., Strongsville, Ohio).

180° Peel adhesion tests were run on pressed film samples of several examples and on an ungrafted polypropylene base polymer control sample using SCOTCH TM adhesive tape #8411 (3M) (an acrylate-based pressure-sensitive adhesive with a 180° peel adhesion to glass of 110 g/cm) and 3M adhesive tape STA-115 (a KRATON TM rubber-based pressure-sensitive adhesive tape with a 180° peel adhesion to glass of 430 g/cm). Results are shown in TABLE 5 below wherein each number represents the average of five independent determinations.

TABLE 5

| Example | Peel Force (acrylate-based) (g/cm) | Peel Force (KRATON TM-based) (g/cm) |
| --- | --- | --- |
| Control PP | 209 | 517 |
| 1 | 198 | 330 |
| 2 | 143 | 308 |
| 3 | 154 | 275 |

TABLE 5 indicates improvement in release properties of graft copolymers of the invention compared to the polypropylene control. Graft copolymers of Examples 1, 2, and 3 show 5%, 32%, and 26% improvement in release properties for the acrylate-based adhesive tape, respectively, and 36%, 40%, and 47% improvement in release properties for the KRATON TM rubber-based adhesive tape.

A pressed film of the graft copolymer of Example 1 was prepared as described above by pressing between PTFE-coated aluminum plates at 200° C. The film was quenched in a room temperature water bath. Samples of the film were then annealed in an oven at 150° C. for various times. Hexadecane contact angle and ESCA measurements were performed as described above. Results are shown in TABLE 6 below.

TABLE 6

| Annealing Time (minutes) | Hexadecane Contact Angle (°) | F:C |
| --- | --- | --- |
| 0 | 22 ± 1 | 0.25 |
| 0.5 | 22 ± 2 | 0.27 |
| 1.0 | 26 ± 3 | 0.24 |
| 2.5 | 32 ± 3 | 0.39 |
| 3.0 | 42 ± 4 | — |
| 5.0 | 40 ± 4 | — |
| 6.0 | 45 ± 3 | 0.45 |
| 8.0 | 47 ± 2 | — |
| 23.0 | 46 ± 2 | — |

The data in TABLE 6 demonstrate that annealing the graft copolymers of the invention at 150° C. enhances surface activity by increasing the amount of fluorochemical at the surface of the graft copolymer. The data above indicate an increase in fluorochemical surface activity with increased annealing time over about 6 minutes, after which time there appears to be little advantage gained by further annealing.

EXAMPLE 10

N-Butyl perfluorooctanesulfonamidoethyl acrylate (BuFOSEA) was grafted to polypropylene (Himont PROFAX TM PP PF-301) as described in Example 1 above. The fluorochemical olefin was added to the extruder at a rate of 2 mL/min (3.16 g/min) with a melt temperature of 180° C. Total flow rate was held at about 40 g/min.

The hexadecane contact angle of the resultant graft polymer was measured and found to be 39°. ESCA showed a F:C ratio of 0.20 on a pressed film prepared as described in Example 1 using PTFE-coated aluminum plates.

Resistance to various solvents was also measured to determine stability of the surface to chemicals. 0.6 g –0.8 g samples of the pressed film were placed in the solutions listed in TABLE 7 below. After storage as indicated in TABLE 7, the film samples were rinsed and dried, and the percent weight loss was determined. Hexadecane contact angles and F:C ratios were measured for each film sample.

TABLE 7

CHEMICAL RESISTANCE OF FLUOROCHEMICAL GRAFT COPOLYMER

| Treatment (days) | Wt. Loss (%) | Hexadecane Contact Angle (°) | F:C Ratio |
| --- | --- | --- | --- |
| Polypropylene Control | — | 0 | — |
| Control[A] | 0% | 32 ± 1 | 0.29 |
| 20% HCl (5) | 3.9% | 43 ± 4 | 0.33 |
| 25% H$_2$SO$_4$ (5) | 1.5% | 42 ± 4 | 0.23 |
| 2% Chromic Acid (5) | 1.2% | 49 ± 1 | 0.32 |
| 3% NaOH (5) | 0.1% | 35 ± 1 | 0.23 |
| Mineral Oil (5) | 5.4% | 24 ± 3 | 0.34 |
| Water (9) | 0.1% | 41 ± 3 | 0.31 |
| Air (9) | 0% | 28 ± 3 | 0.45 |
| Hexane (3)[A] | 2.9% | 25 ± 3 | 0.45 |

[A]Treatment at room temperature. All others are at 82° C.

The data in TABLE 7 show that exposure to aqueous treatment decreases hexadecane contact angle, while treatment with hydrophobic organic materials increases hexadecane contact angle. However, in all cases, hexadecane contact angle remains between 20° and 50° after treatment. This indicates that oil repellency is maintained, and that the graft copolymers of the invention are resistant to chemical degradation under the indicated conditions.

EXAMPLES 11–46

Polypropylene/BuFOSEA graft copolymers were prepared as described in Examples 1–9, above except that in Examples 11–22 only LUPERSOL TM 101 initiator was used in the amounts set forth in TABLE 9; in Examples 23–34 only LUPERSOL TM 130 initiator was used in the amounts set forth in TABLE 9; in Examples 35–46 a 1:1 mixture of LUPERSOL TM 101 initiator and LUPERSOL TM 130 initiator was used in the amounts set forth in TABLE 9. Screw speed was 100 rpm, and monomer flow was 2 mL/min. The percent of grafted fluorochemical olefin was determined using x-ray fluorescence spectrometry to determine percent fluorine. Processing conditions, i.e., melt temperature and total flow, mole percent BuFOSEA reacted, and weight percent grafted BuFOSEA in the graft copolymers, are shown in TABLE 8.

TABLE 8

| Example | Initiator (Conc. wt. %) | Melt Temp (°C.) | Total Flow (g/min) | Mol % BuFOSEA Reacted | Wt % BuFOSEA |
| --- | --- | --- | --- | --- | --- |
| 11 | L101(0.1) | 180 | 40.9 | 81 | 6.3 |
| 12 | L101(0.1) | 200 | 348 | 70 | 6.4 |
| 13 | L101(0.1) | 220 | 36.7 | 79 | 6.8 |
| 14 | L101(0.25) | 180 | 30.3 | 78 | 8.1 |
| 15 | L101(0.25) | 200 | 40.8 | 89 | 6.9 |
| 16 | L101(0.25) | 220 | 39.3 | 86 | 6.9 |
| 17 | L101(0.5) | 180 | 40.6 | 91 | 7.1 |
| 18 | L101(0.5) | 200 | 42.9 | 88 | 6.5 |
| 19 | L101(0.5) | 220 | 46.3 | 86 | 5.9 |
| 20 | L101(1.0) | 180 | 45.6 | 92 | 6.4 |
| 21 | L101(1.0) | 200 | 38.6 | 90 | 7.2 |
| 22 | L101(1.0) | 220 | 53.6 | 95 | 8.9 |
| 23 | L130(0.1) | 180 | 42.8 | 88 | 6.5 |
| 24 | L130(0.1) | 200 | 46.7 | 96 | 6.5 |
| 25 | L130(0.1) | 220 | 45.9 | 100 | 6.9 |
| 26 | L130(0.25) | 180 | 41.4 | 93 | 7.1 |
| 27 | L130(0.25) | 200 | 41.6 | 86 | 6.5 |
| 28 | L130(0.25) | 220 | 47.6 | 88 | 5.8 |
| 29 | L130(0.5) | 180 | 29.9 | 75 | 7.9 |
| 30 | L130(0.5) | 200 | 43.4 | 93 | 6.8 |
| 31 | L130(0.5) | 220 | 43.3 | 99 | 7.2 |
| 32 | L130(1.0) | 180 | 39.5 | 98 | 7.8 |
| 33 | L130(1.0) | 200 | 24.7 | 70 | 9.0 |

TABLE 8-continued

| Example | Initiator (Conc. wt. %) | Melt Temp (°C.) | Total Flow (g/min) | Mol % BuFOSEA Reacted | Wt % BuFOSEA |
| --- | --- | --- | --- | --- | --- |
| 34 | L130(1.0) | 220 | 43.1 | 86 | 6.3 |
| 35 | L101/L130(0.1) | 180 | 36.3 | 63 | 5.5 |
| 36 | L101/L130(0.1) | 200 | 42.3 | 73 | 5.5 |
| 37 | L101/L130(0.1) | 220 | 42.0 | 76 | 5.7 |
| 38 | L101/L130(0.25) | 180 | 34.2 | 64 | 5.9 |
| 39 | L101/L130(0.25) | 200 | 49.9 | 94 | 5.9 |
| 40 | L101/L130(0.25) | 220 | 37.5 | 73 | 6.1 |
| 41 | L101/L130(0.50) | 180 | 35.8 | 78 | 6.9 |
| 42 | L101/L130(0.50) | 200 | 33.0 | 78 | 7.6 |
| 43 | L101/L130(0.50) | 220 | 35.1 | 74 | 6.7 |
| 44 | L101/L130(1.0) | 180 | 27.0 | 73 | 8.5 |
| 45 | L101/L130(1.0) | 200 | 37.7 | 100 | 8.4 |
| 46 | L101/L130(1.0) | 220 | 41.3 | 100 | 9.6 |
| Control | — | 180 | 40 | 0 | 0 |

Table 8 indicates that graft copolymers of this invention can be made at a wide variety of initiator concentrations. All Examples contained at least 5.0% (by weight) BuFOSEA, and grafting efficiency was good in all Examples, ranging from 63% to 100%.

EXAMPLE 47

Figure 3:
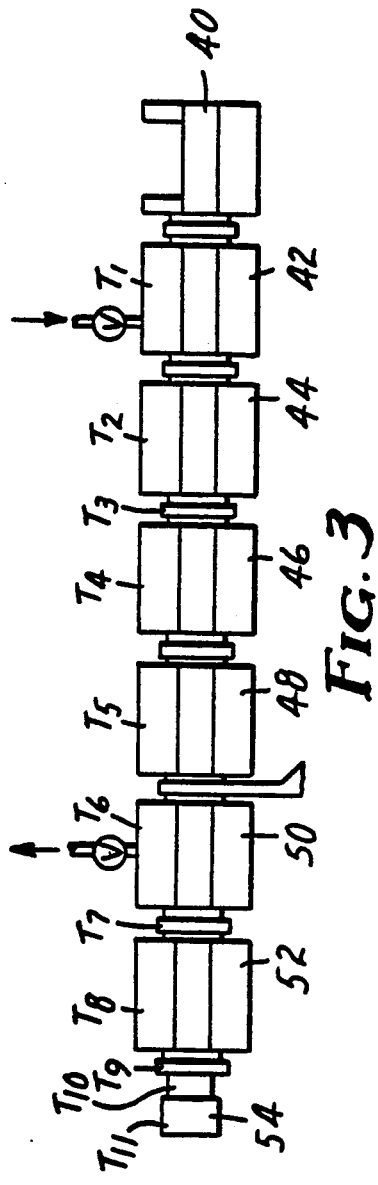
FIG. 3 is a flow diagram of another counter-rotating twin screw extruder useful in the process of this invention.

FIG. 3 shows a twin screw extruder much like that shown in FIG. 2 and described in Examples 1-9 above. Particularly, the extruder comprises a feed zone 40, a heated barrel that comprises barrel section 42 comprising both an initiation/melt zone and a monomer addition zone, barrel sections 44, 46, and 48 comprising a reaction zone, barrel section 50 comprising a devolatilization zone and barrel section 52 comprising a block zone, and a die 54. Transducer ports (e.g., $T_1$ represents transducer number 1 in barrel section 42) are located as shown in FIG. 3, and thermocouple ports are located in each heated section of the extruder. The extruder was a LEISTRITZ TM Model ASF67GG.

Temperature profile of the extruder was as shown in TABLE 9 below:

TABLE 9

| Transducer | T (°C.) |
| --- | --- |
| 1 | 182 |
| 2 | 171 |
| 3 | 181 |
| 4 | 179 |
| 5 | 188 |
| 6 | 181 |
| 7 | 181 |
| 8 | 180 |
| 9 | 180 |
| 10 | 194 |
| 11 | 194 |

The feed zone was ambient temperature, and screw speed was 50 rpm.

Base polymer feed hopper and extruder feed throat were purged with nitrogen. Base polymer (DYPRO TM 8771) was fed at a rate of 18.1 kg/h using a K-tron 6300 feeder. The initiator, a 1:1 mixture by weight of LUPERSOL TM 130 initiator and LUPERSOL TM 101 initiator, was purged with nitrogen and fed at a rate of 2 mL/min using a single piston RUSKA TM positive displacement pump at the downstream end of the feed throat, a distance of 270 mm from the start of the screws. BuFOSEA was purged with nitrogen and fed at a rate of 463 mL/h through a high pressure injection valve using a dual piston RUSKA TM positive displacement pump, at a distance of 610 mm from the start of the screws. Vacuum venting of unreacted BuFOSEA was performed in heated barrel section 50. Product graft copolymer was extruded through a 10-strand die that fed into a water bath and a CONAIR TM pelletizer.

EXAMPLES 48-56

Films of the graft copolymer were made as in Example 1 using chrome-coated aluminum plates at 190° C. and a pressure of 837 mPA for 30 seconds. Also, films were made by pressing the graft copolymer of this invention between plates that had been covered with polyimide tape (KAPTON TM Film Tape #5413, 3M) and plates that had been covered with PTFE tape (SCOTCH TM PTFE Film Tape #5490, 3M). Films of graft copolymers of Examples 1 and 4 were also made by pressing the graft copolymer of the invention between the chrome, polyimide, and PTFE surfaces as described above. Hexadecane contact angles were measured as described in Example 1 above. Results are shown in TABLE 10 wherein each result is an average of ten independent determinations.

TABLE 10

| Example | Polymer Sample | Hexadecane Contact Angle (°) | | |
| --- | --- | --- | --- | --- |
| | | Chrome | Polyimide | PTFE |
| | PP Control | 0 | 0 | 0 |
| 48 | Example 1 | 16 ± 3 | | |
| 49 | Example 1 | | 33 ± 2 | |
| 50 | Example 1 | | | 49 ± 5 |
| 51 | Example 4 | 13 ± 2 | | |
| 52 | Example 4 | | 29 ± 3 | |
| 53 | Example 4 | | | 43 ± 4 |
| 54 | Example 47 | 19 ± 2 | | |
| 55 | Example 47 | | 27 ± 1 | |
| 56 | Example 47 | | | 50 ± 5 |

The results in TABLE 10 show that the graft copolymer of Example 47 exhibits surface activity similar to that of the graft copolymers of Examples 1 and Example 4. The results in TABLE 10 also show the effect of the surface against which the graft copolymer is formed. The samples melted against the PTFE surface show higher surface activity than those formed against the more polar surfaces polyimide and chrome.

EXAMPLES 57-59

The following examples describe graft polymerization of N-ethyl perfluorooctanesulfonamidoethyl acrylate (EtFOSEA) to polypropylene. Polypropylene (Amoco PP 5219, Amoco Chemical Naperville, Ill.) was premixed with 0.25 wt % LUPERSOL TM 101 initiator, 0.25 wt % LUPERSOL TM 130 initiator, and 5.0 wt % EtFOSEA. The mixture was purged with nitrogen, added in the feed zone, extruded, and collected as described in Example 1. Screw speed of the extruder was 100 rpm. TABLE 11 lists the process conditions for Examples 57-59.

TABLE 11

| Example | Melt Temp. (°C.) | Total Flow Rate (g/min) |
|---|---|---|
| 57 | 180 | 40.6 |
| 58 | 200 | 43.7 |
| 59 | 220 | 40.5 |

EXAMPLES 60-65

Films of the graft copolymers of Examples 57-59 were made as described in Example 1 by pressing between chrome surfaces at 185° C. and 2790 mPA for 60 seconds, and by pressing between PTFE surfaces at 174° C. and 1046 mPA for 30 seconds as indicated in TABLE 12 below. Hexadecane contact angles were measured and are shown in TABLE 12, wherein each entry represents the average of ten independent determinations.

TABLE 12

| Example | Polymer Sample | Hexadecane Contact Angle (°) Chrome | PTFE |
|---|---|---|---|
| — | PP Control | 0 | 0 |
| 60 | Example 57 | 25 ± 2 | |
| 61 | Example 57 | | 65 ± 2 |
| 62 | Example 58 | 24 ± 3 | |
| 63 | Example 58 | | 69 ± 3 |
| 64 | Example 59 | 31 ± 1 | |
| 65 | Example 59 | | 71 ± 3 |

The data in TABLE 12 indicate that the pressed films of the invention have high surface activity compared to that of the polypropylene control. Also, the PTFE-pressed films have a twofold or greater hexadecane contact angle than the chrome-pressed films.

EXAMPLES 66-67

The following Examples describe the graft polymerization of N-ethyl perfluorooctanesulfonamidoethyl methacrylate (EtFOSEMA) to polypropylene.

Polypropylene (Amoco PP 5219, Amoco Chemical, Naperville, Ill.)/EtFOSEMA graft copolymers were prepared as described in Examples 1-9 above. The EtFOSEMA was used as a 1:1 solution by weight in tetrahydrofuran, and the solution was fed at 4 mL/min. Melt temperatures were 180° C. for Example 66 and 200° C. for Example 67. Tetrahydrofuran and unreacted monomer were vented as in Examples 1-9. Screw speed was 60 rpm. Polymer flow rates were 38.3 (Example 66) and 42.4 (Example 67) g/min.

EXAMPLES 68-71

TABLE 13 lists the hexadecane contact angles of films prepared from the graft copolymers of Examples 66 and 67. Results indicate improved surface activity compared to the control sample, and a higher surface activity for the PTFE-pressed films compared to the chrome-pressed films.

TABLE 13

| Example | Polymer Sample | Hexadecane Contact Angle (°) Chrome | PTFE |
|---|---|---|---|
| | PP Control | 0 | 0 |
| 68 | Example 66 | 14 ± 2 | |
| 69 | Example 66 | | 24 ± 3 |
| 70 | Example 67 | 14 ± 3 | |
| 71 | Example 67 | | 30 ± 3 |

EXAMPLES 72-73

The following examples describe graft polymerization of N-allyl perfluorooctanessulfonamidomethyl ethane (AlFOSME) to polypropylene (Amoco PP 5219).

These graft copolymers were prepared as in Examples 66 and 67 with melt temperatures of 180° C. (Example 72) and 200° C. (Example 73) and polymer flow rates of 41.7 (Example 72) and 42.3 (Example 73) g/min.

EXAMPLES 74-77

TABLE 14 lists hexadecane contact angles on films of the graft copolymers of Examples 72 and 73, prepared as in Examples 60-65. Again, increased fluorochemical surface activity compared to the control sample was seen, and the PTFE-pressed films showed higher surface activity than the chrome-pressed films.

TABLE 14

| Example | Polymer Sample | Hexadecane Contact Angle (°) Chrome | PTFE |
|---|---|---|---|
| | PP Control | 0 | 0 |
| 74 | Example 72 | 15 ± 1 | |
| 75 | Example 72 | | 45 ± 3 |
| 76 | Example 73 | 22 ± 3 | |
| 77 | Example 73 | | 42 ± 3 |

EXAMPLES 78-83

The following Examples describe the preparation of fluorochemical graft copolymers using low molecular weight base polymers. The graft copolymers were prepared according to the general method of Examples 1-9 above using a 1:1 mixture of LUPERSOL TM 101 initiator and LUPERSOL TM 130 initiator as the initiator system and the components and conditions listed in TABLE 15 below. The fluorochemical olefins were used in an amount of 10 percent by weight based on the weight of the base polymer. Initiator concentration is based on the weight of the base polymer.

The graft copolymers were extruded into film substrates of 0.1 mm thickness. ESCA analysis and 180° peel adhesion results (using the test described above in connection with TABLE 5 and 3M Box Sealing Tape #371, a KRATON TM rubber-based adhesive tape with a peel strength of 610 g/cm when adhered to glass) are shown in TABLE 15.

The ESCA data of TABLE 15 indicate that there is more fluorine on the surface of the films than would be expected based on the amount of fluorochemical olefin used in preparing the graft copolymer. The release data indicate in all cases that the initial peel force of the films was superior to that of control base polymer.

TABLE 15

| Example | Base Polymer (MFI[C]) | Fluorochemical Olefin | Total Initiator Concentration (%) | ESCA (% F) | Peel Force (g/cm) Initial | Peel Force (g/cm) Aged[D] |
|---|---|---|---|---|---|---|
| PP control | Exxon[A] 3085 (35) | — | — | 0 | 500 | 550 |
| 78 | Exxon[A] 3085 (35) | EtFOSEA | 1 | 39 | 80 | 560 |
| 79 | Exxon[A] 3085 (35) | EtFOSEA | 0.5 | 47 | 310 | 460 |
| 80 | Exxon[A] 3085 (35) | EtFOSEMA | 0.5 | 33 | 140 | 630 |
| PE control | Dow[B] 40060M (40) | — | — | 0 | 160 | 510 |
| 81 | Dow[B] 40060M (40) | EtFOSEA | 0.25 | 38 | 20 | 250 |
| 82 | Dow[B] 40060M (40) | EtFOSEA | 0.12 | 22 | 20 | 170 |
| 83 | Dow[B] 40060M (40) | EtFOSEMA | 0.25 | 48 | 190 | 340 |

[A]Exxon Chemical Co., Houston, TX
[B]Dow Chemical Co., Midland, MI
[C]Melt flow index
[D]"Aged" peel force was determined using the 180° Peel Test after heating the tape/substrate sample at 43° C. for 11 days.

Examples 78-80 do not have particularly durable aged peel force. In the case of Examples 81-83, however, aged peel force was significantly lower than that of the control polyethylene base polymer and in the range suitable for commercial tape applications.

EXAMPLES 84-88

Polymer blend films were made by dry-blending 10 parts by weight of a graft copolymer of the invention with 90 parts by weight of a pure matrix polymer, adding the resulting mixture to the hopper of a 1¼ inch (5 cm) Killion extruder (Killion Extruders, Inc., Verona, N.J.), and extruding into a 0.1 mm thick, 15.2 cm wide film substrate under the following conditions:

| Extruder temperatures: | Zone 1 | 149° C. |
|---|---|---|
| | Zone 2 | 201° C. |
| | Zone 3 | 220° C. |
| | Zone 4 | 221° C. |
| | Neck tube | 218° C. |
| | Die | 218° C. |
| Extruder rpm: | 25 | |
| Casting roll temperature: | 15° C. | |

Film substrates were made using the components set forth in TABLE 16 below. ESCA results and 180° peel adhesion results are also shown in TABLE 16.

TABLE 16

| Example | Matrix Polymer | Graft Copolymer | ESCA (% F) | Aged Peel Force (g/cm)[C] |
|---|---|---|---|---|
| PE control | Dow[A] 6806 | — | 0 | 540 |
| 84 | Dow[A] 6806 | Example 81 | 15 | 400 |
| PP control | Fina[B] 3374X | — | 0 | 580 |
| 85 | Fina[B] 3374X | Example 83 | 17 | 260 |
| 86 | Fina[B] 3374X | Example 79 | 23 | 340 |
| 87 | Fina[B] 3374X | Example 78 | 18 | 220 |
| 88 | Fina[B] 3374X | Example 82 | 14 | 260 |

[A]Dow Chemical Co., Midland, MI
[B]Fina Chemical Co.
[C]"Aged" peel force was determined using the 180° Peel Test set forth in Examples 1-9 above (3M adhesive tape STA-115) after heating the tape/substrate sample at 43° C. for 11 days.

The ESCA data of Table 16 indicate that there is more fluorine on the surface of the films than would be expected based on the amount of graft copolymer used in preparing the blend. The release data indicate in all cases the aged peel force of the blend is lower than that of the control base polymer and in the range suitable for commercial tape applications.

Various modifications and alterations of this invention will become apparent to those skilled in the art without departing from the scope and spirit of this invention, and it should be understood that this invention is not to be unduly limited to the embodiments set forth herein.

We claim:

1. A fluorochemical graft copolymer comprising: a base polymer comprising polymerized units derived from monomers having terminal olefinic double bonds, having grafted thereto a moiety of the formula —CH$_2$—CHR—Q—R$_f$ wherein R is hydrogen, trifluoromethyl, or lower alkyl;
Q is a divalent linking group that does not substantially interfere with free radical polymerization; and
R$_f$ is a fluoroaliphatic group comprising a fully fluorinated terminal group containing at least seven fluorine atoms.

2. A graft copolymer according to claim 1, wherein the base polymer is selected from the group consisting of polymethyl methacrylate, poly-4-methylpentene, polypropylene, polybutylene, polystyrene, polyethylene, polybutadiene, ethylene/vinyl acetate copolymer, ethylene/butyl acrylate copolymer, and mixtures and blends thereof.

3. A graft copolymer according to claim 1, wherein the grafted moiety is a fluorochemical olefin of the formula C$_8$F$_{17}$SO$_2$N(C$_4$H$_9$)CH$_2$CH$_2$OC(O)CH=CH$_2$.

4. A graft copolymer according to claim 1, wherein the grafted moiety is a fluorochemical olefin of the formula C$_8$F$_{17}$SO$_2$N(C$_2$H$_5$)CH$_2$CH$_2$OC(O)CH=CH$_2$.

5. A graft copolymer according to claim 1, wherein the grafted moiety is a fluorochemical olefin of the formula C$_8$F$_{17}$SO$_2$N(C$_2$H$_5$)CH$_2$CH=CH$_2$.

6. A graft copolymer according to claim 1, wherein the grafted moiety is a fluorochemical olefin of the formula C$_8$F$_{17}$SO$_2$N(C$_2$H$_5$)CH$_2$CH$_2$OC(O)C(CH$_3$)=CH$_2$.

7. A graft copolymer according to claim 1, wherein the base polymer is a low molecular weight polyolefin.

8. A graft copolymer according to claim 7, wherein the base polymer has a melt index of at least about 20 and up to about 500.

* * * * *